United States Patent [19]
Lai

[11] Patent Number: 5,725,225
[45] Date of Patent: Mar. 10, 1998

[54] SHOCK-ABSORBING ASSEMBLY OF BICYCLE

[76] Inventor: Yen-Pin Lai, 199 Wu Tung South Rd., Pu Hsin Hsiang, Changhua, Taiwan

[21] Appl. No.: 794,541

[22] Filed: Feb. 3, 1997

[51] Int. Cl.⁶ ........................................ B62K 3/02
[52] U.S. Cl. ............................. 280/275; 280/283
[58] Field of Search ..................... 280/281.1, 283, 280/284, 285, 286, 288, 274, 275

[56] References Cited

U.S. PATENT DOCUMENTS 591,306  10/1897  Tolson ......................... 280/283
5,269,552  12/1993  Yelverton ..................... 280/283
5,409,248  4/1995  Williams ..................... 280/283 X

*Primary Examiner*—Robert J. Oberleitner
*Assistant Examiner*—Tyrone M. Lee
*Attorney, Agent, or Firm*—Beveridge, DeGrandi, Weilacher & Young LLP

[57] ABSTRACT

A bicycle shock-absorbing assembly is composed of a connection rod, a position restricting nut, a coil spring, a dustproof jacket, a resilient locating ring, a front reinforcing member, and a rear reinforcing member. The bicycle shock-absorbing assembly is arranged such that it is capable of alleviating the impact force which is transmitted from the bicycle wheels to the top tube, the seat tube, and the down tube of the bicycle.

4 Claims, 8 Drawing Sheets

SHOCK-ABSORBING ASSEMBLY OF BICYCLE

FIELD OF THE INVENTION

The present invention relates generally to a bicycle frame, and more particularly to a shock-absorbing assembly of the bicycle frame.

BACKGROUND OF THE INVENTION

The conventional bicycle frame is generally dependent on its front fork and rear fork for absorbing the shock transmitted from the wheels in contact with the road surface. The front fork and the rear fork of the bicycle frame are not capable of absorbing the shock effectively. In order to improve the shock-absorbing effect of the bicycle frame, certain conventional bicycle frames are provided with an oil pressure cylinder fastened pivotally therewith. However, the shock-absorbing effect of the oil pressure cylinder is rather poor such that the impact force transmitted from the bicycle wheels is prone to concentrate at the junctures where the oil pressure cylinder and the bicycle frame are fastened pivotally, thereby making the bicycle frame rather vulnerable to damage.

SUMMARY OF THE INVENTION

It is therefore the primary objective of the present invention to provide a bicycle shock-absorbing assembly capable of absorbing shock effectively without undermining the structural integrity of the bicycle frame.

It is another objective of the present invention to provide a bicycle shock-absorbing assembly which can be assembled and d is assembled easily and rapidly.

It is still another objective of the present invention to provide a bicycle shock-absorbing assembly which is cost-effective.

It is still another objective of the present invention to provide a bicycle shock-absorbing assembly without adding additional weight to the bicycle frame.

In keeping with the principle of the present invention, the foregoing objectives of the present invention are attained by the bicycle shock-absorbing assembly, which is mainly composed of a connection rod, a position restricting nut, a coil spring, a dustproof jacket, a resilient locating ring, a front reinforcing member, and a rear reinforcing member. The bicycle shock-absorbing assembly is so arranged that it is capable of alleviating the impact force transmitted from the bicycle wheels through the top tube, the down tube and the seat tube of the bicycle frame.

The foregoing objectives, features, functions, and advantages of the present invention will be more readily understood upon a thoughtful deliberation of the following detailed description of the embodiments of the present invention in conjunction with the accompanying drawings.

DETAILED DESCRIPTION OF THE EMBODIMENTS

Figure 1:
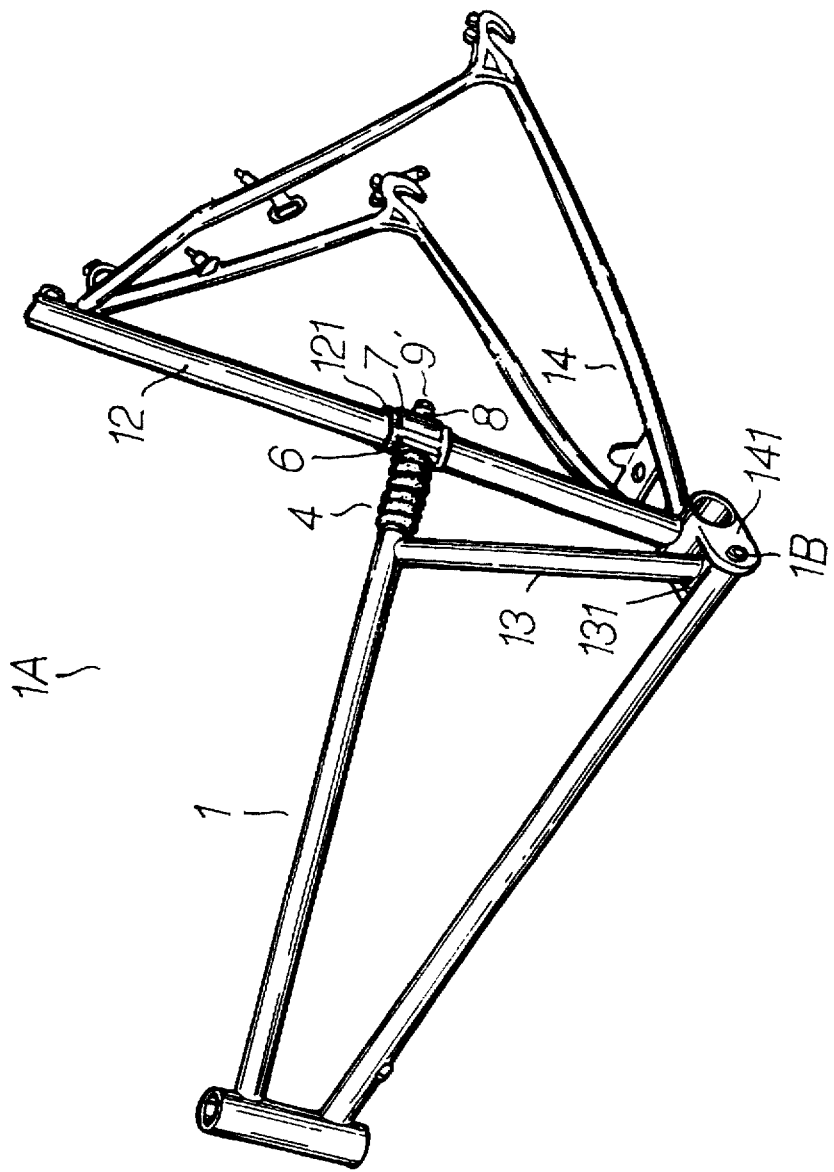
FIG. 1 shows a perspective view of the present invention.
Figure 2:
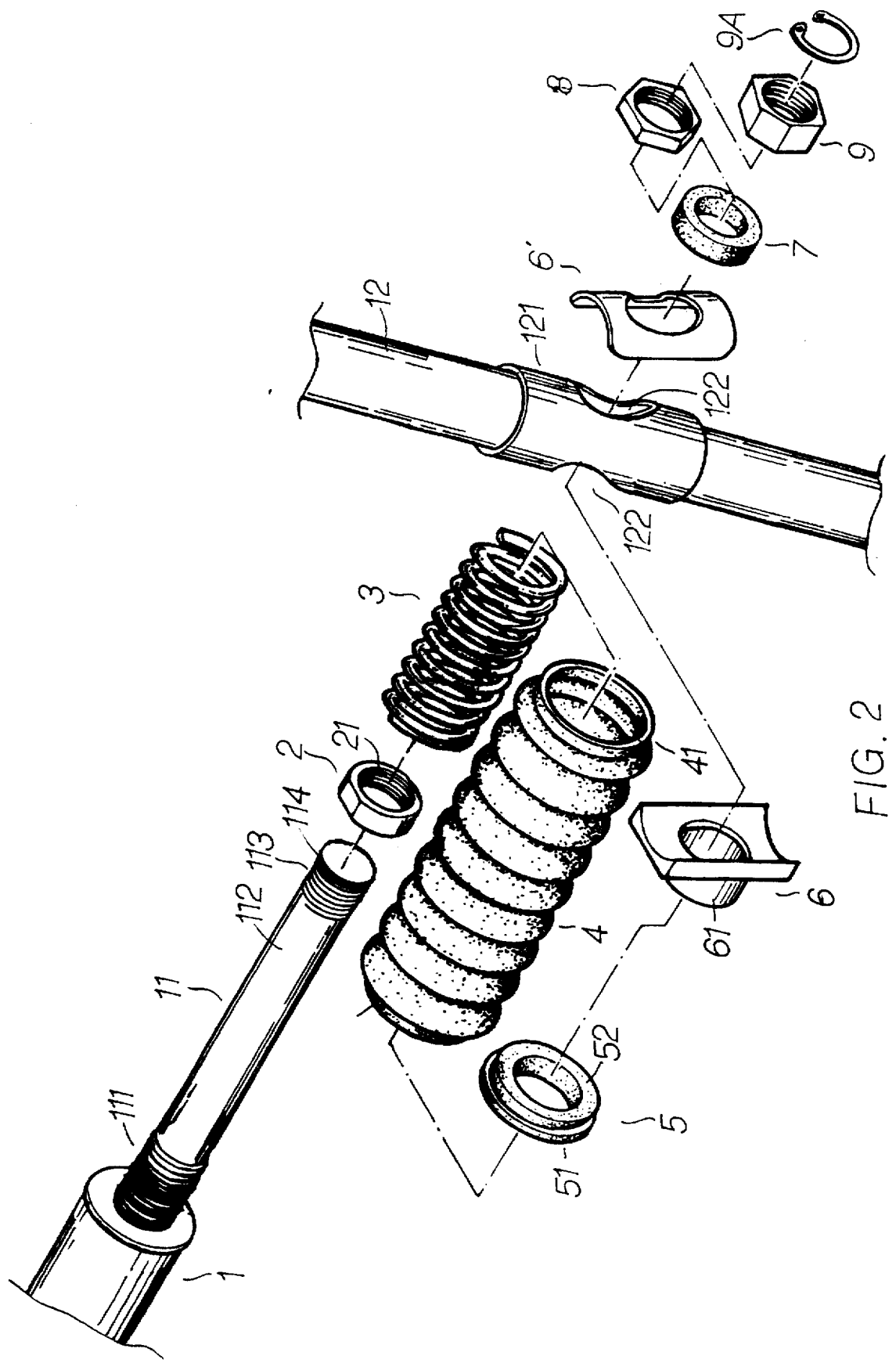
FIG. 2 shows an exploded view of the present invention.
Figure 3:
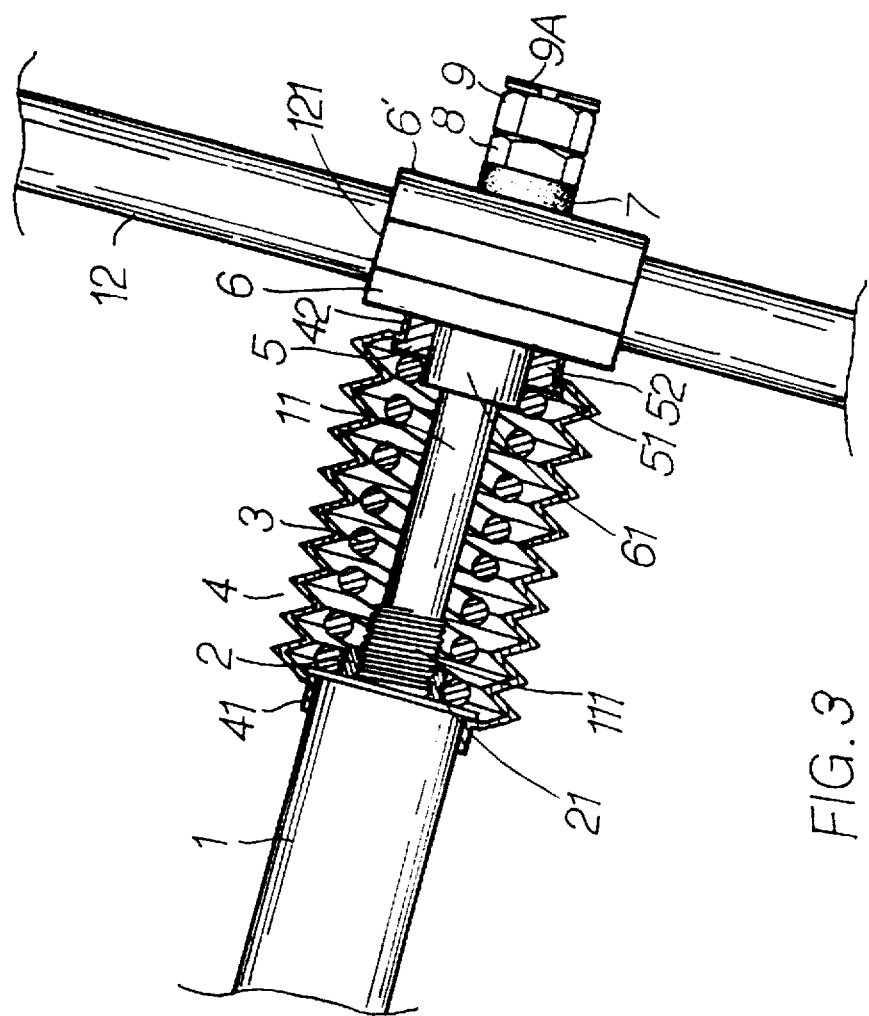
FIG. 3 shows a sectional view of the present invention in combination.

As shown in FIGS. 1–4, a bicycle shock-absorbing assembly embodied in the present invention is composed of the component parts, which are described explicitly hereinafter.

A connection rod 11 is fastened with the rear end of the top tube 1 of a bicycle frame 1A and is provided with a front threaded segment 111, a rear threaded segment 113, a smooth segment 112 located between the front threaded segment 111 and the rear threaded segment 113, and a circular groove 114 contiguous to the rear threaded segment 113.

A position restriction nut 2 is provided with inner threads 21, which are engaged with the front threaded segment 111 of the connection rod 11.

A coil spring 3 is fitted over the connection rod 11 such that the coil spring 3 is located securely by the nut 2.

A dustproof jacket 4 of a tubular construction is fitted over the coil spring 3 such that one end 41 of the jacket 4 is fitted over the front end of the connection rod 11, and that another end 42 of the jacket 4 is fitted over the rear end of the connection rod 11.

A resilient locating ring 5 has one edge 51 in contact with another end 42 of the dustproof jacket 4, and another edge 52 opposite in location to the edge 51.

A front reinforcing member 6 has a through hole and a projection 61 which is engaged with the edge 52 of the locating ring 5 such that one end of the coil spring 3 is retained securely by the projection 61. The front reinforcing member 6 is engaged with a connection sleeve 121 of the seat tube 12 of the bicycle frame 1A.

A rear reinforcing member 6' is engaged with the connection sleeve 121 of the seat tube 12 of the bicycle frame 1A such that the rear reinforcing member 6' is opposite in location to the front reinforcing member 6. The rear reinforcing member 6 has a through hole in which the connection rod 11 is received via the through hole of the front reinforcing member 6 and a through hole of the seat tube 12 and a through hole 122 of the connection sleeve 121.

The rear end of the connection rod 11 is received in the through hole of the seat tube 12 and the through hole 122 of the connection sleeve 121 such that the rear threaded segment 113 of the connection rod 11 is engaged with a fastening nut 8 and an adjusting nut is, and that the circular groove 114 of the connection rod 11 is provided with a C-shaped retaining ring 9A. Located between the rear reinforcing member 6' and the fastening nut 8 is an elastic ring 7.

Figure 4:
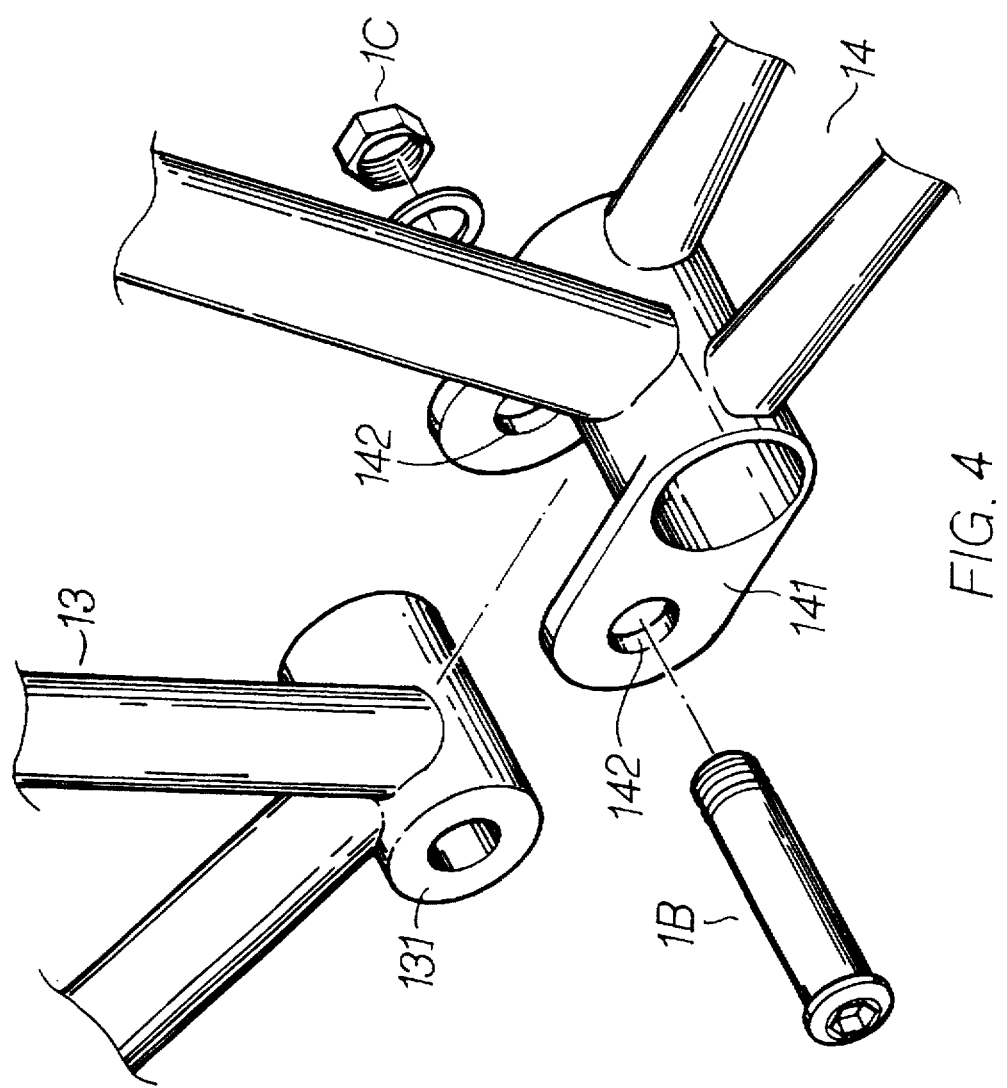
FIG. 4 shows a partial exploded view of the present invention.
Figure 5:
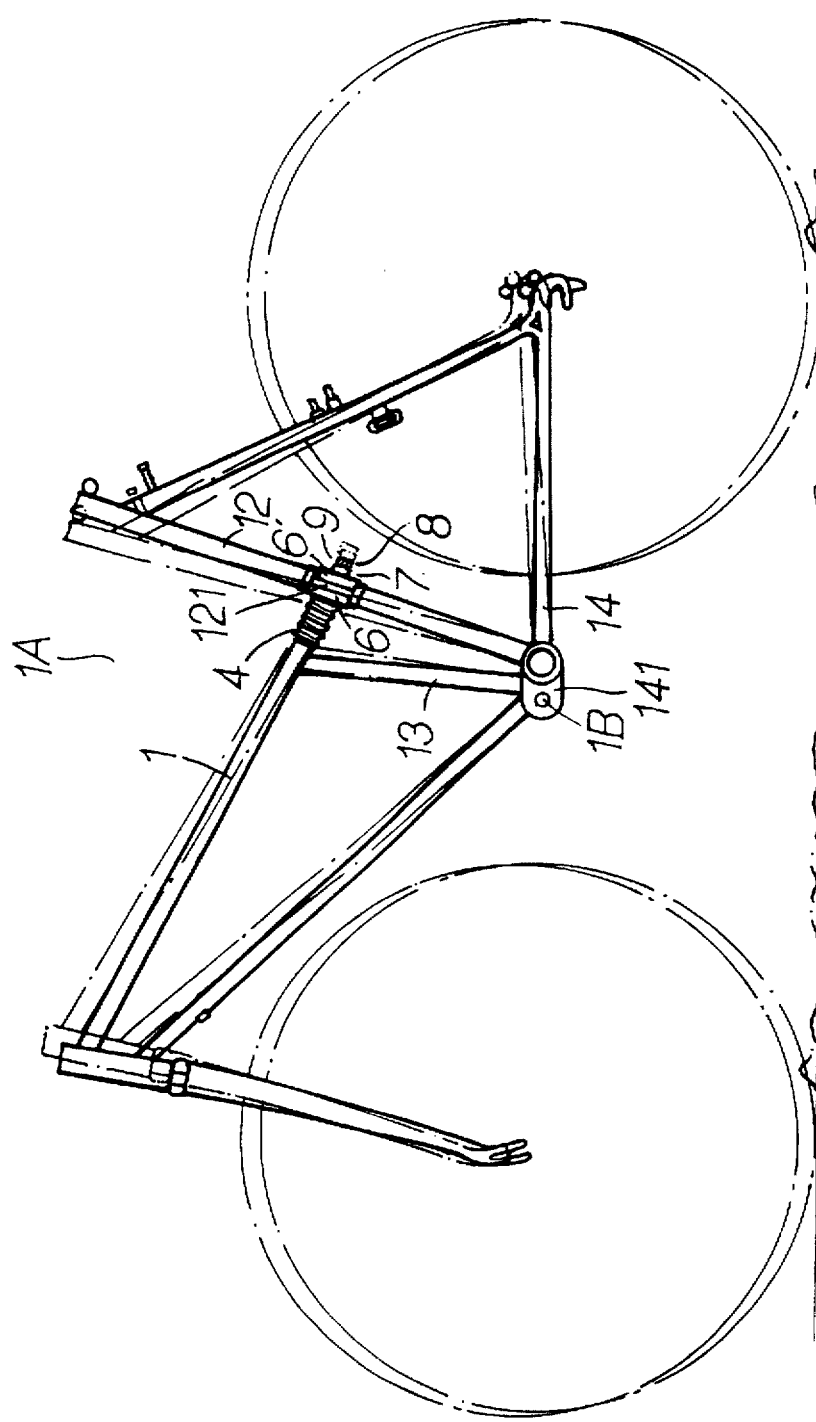
FIG. 5 shows another perspective view of the present invention.

A front support rod 13 is fastened at the connection end 131 thereof with the top tube 1, and at another end thereof with the juncture of the seat tube 12, the downtube of the bicycle frame 1A, and a rear support rod 14. The rear support rod 14 has a U-shaped connection end 141 having two through holes 142 for fastening pivotally the connection end 131 of the front support rod 13 in conjunction with a pin 1B which is received in the through holes 142 of the rear support rod 14. The pin 1B has a threaded end engagable with a locating nut 1C, as shown in FIG. 4. The shock-absorbing assembly of the present invention is so arranged that the impact force is effectively absorbed throughout the entire bicycle frame 1A, as illustrated in FIG. 5.

Figure 6:
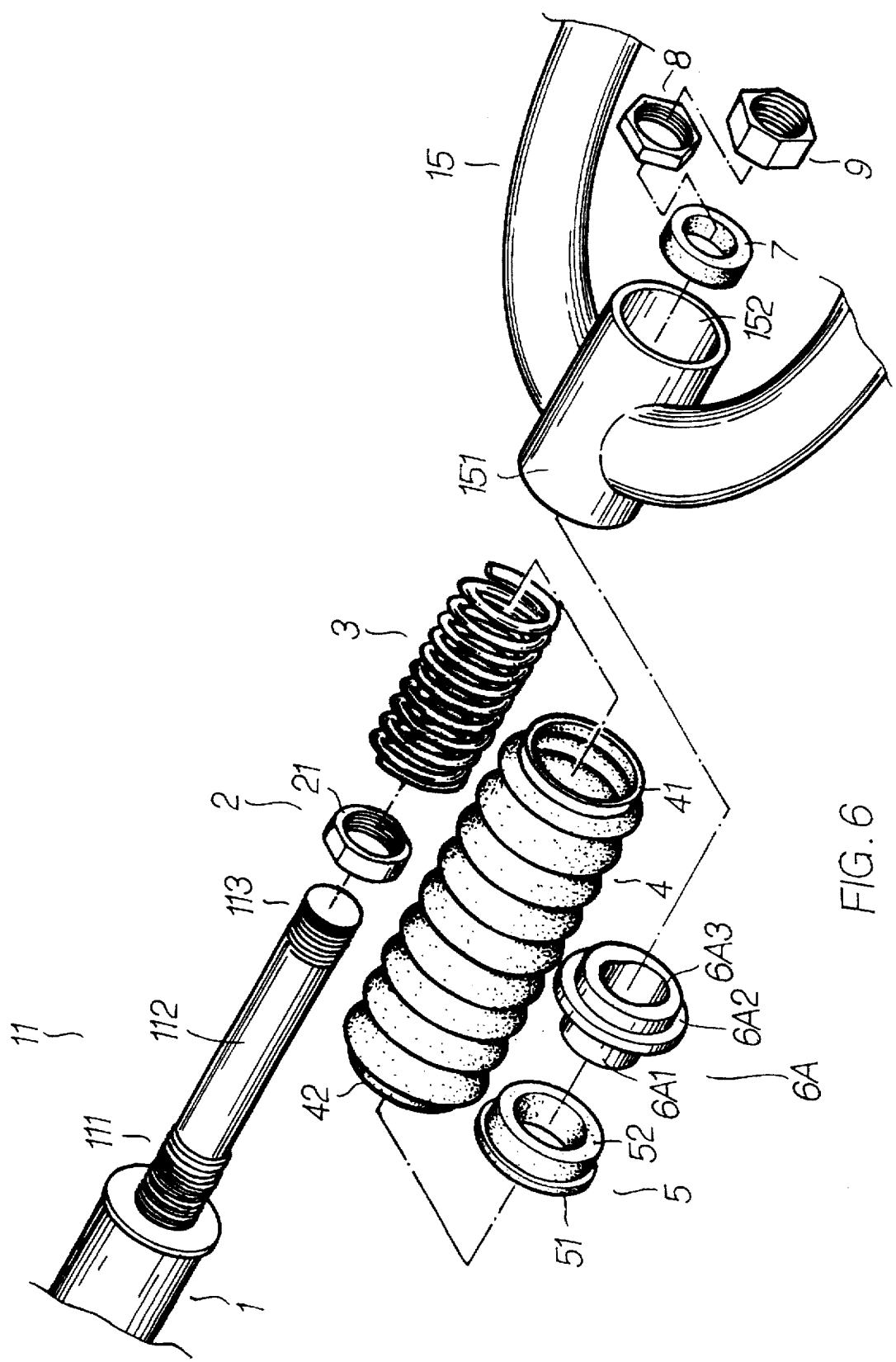
FIG. 6 shows an exploded view of another preferred embodiment of the present invention.
Figure 7:
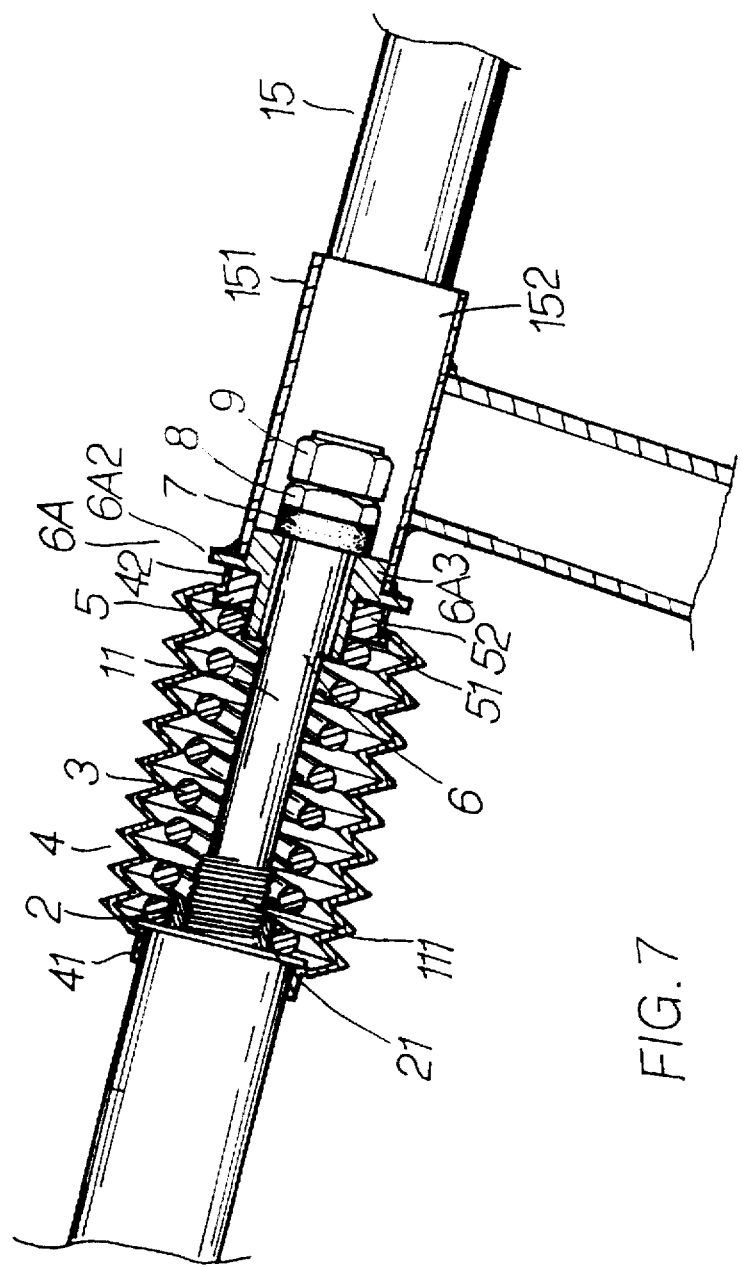
FIG. 7 shows a sectional view of another preferred embodiment in combination according to the present invention.
Figure 8:
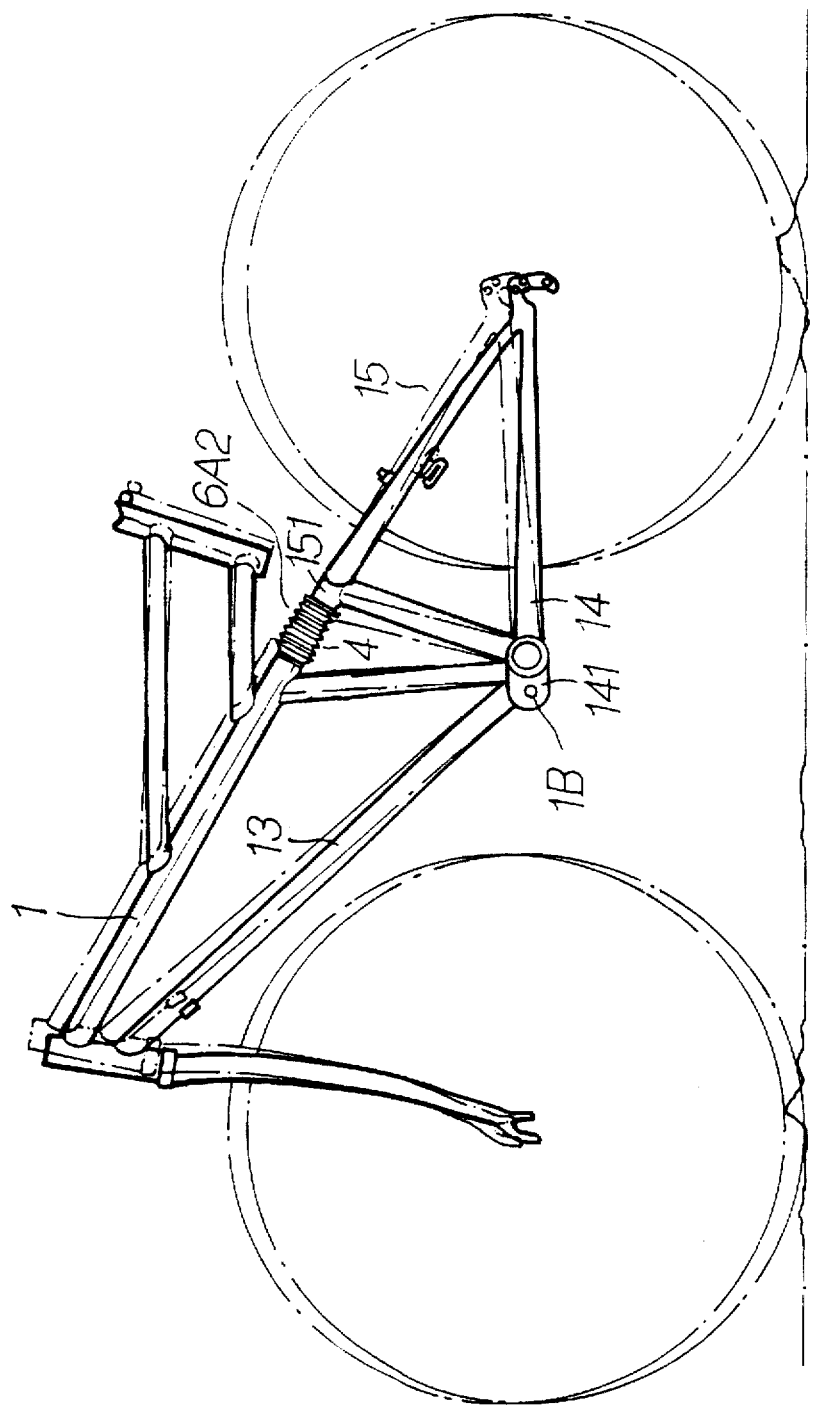
FIG. 8 shows still another perspective view of another embodiment.

The embodiment of the present invention described above is deemed to be merely illustrative and not restrictive. Accordingly, the present invention may be embodied in other specific forms without deviating from the spirit thereof. For example, the connection sleeve 151 of the seat tube 15 may be aligned with the top tube 1, as shown in FIG. 6–8. The connection sleeve 151 has an axial hole 152. The connection rod 11 is engaged with the seat tube 15 such that an engaging end 6A3 of an engagement member 6A is fitted securely into one end of the axial hole 152 of the connection sleeve 151 of the seat tube 15, and that a retaining end 6A1 of the engagement member 6A is engaged securely with one end of the coil spring 3, and further that a flange 6A2 of the engagement member 6A is stopped by the edge of the one end of the axial hole 152 of the connection sleeve 151 of the seat tube 15. The present invention is therefore to be limited only by the scopes of the following appended claims.

What is claimed is:

1. A bicycle frame with shock-absorbing assembly including a top tube, a seat tube and a down tube of the bicycle; the combination comprises:

a connection rod fastened with one end of the top tube of the bicycle and provided with a front threaded segment, a rear threaded segment, a smooth segment located between said front threaded segment and said rear threaded segment, and a circular groove contiguous to said rear threaded segment;

a position restricting nut having inner threads engaged with said front threaded segment of said connection rod;

a coil spring fitted over said connection rod such that said coil spring is located by said position restricting nut;

a dustproof jacket of a tubular construction and fitted over said coil spring such that one end of said dustproof jacket is fitted over one end of said connection rod, and that another end of said dustproof jacket is fitted over another end of said connection rod;

a resilient locating ring having one edge in contact with said another end of said dustproof jacket, said locating ring further having another edge opposite in location to said one edge;

a front reinforcing member provided with a through hole, and a projection engaged with said another edge of said resilient locating ring such that said projection retains securely said coil spring, and that said front reinforcing member is engaged with a connection sleeve of the seat tube of the bicycle;

a rear reinforcing member engaged with the connection sleeve of the seat tube of the bicycle such that said rear reinforcing member is opposite in location to said front reinforcing member, said rear reinforcing member provided with a through hole for receiving said connection rod via said through hole of said front reinforcing member, a through hole of the seat tube and a through hole of the connection sleeve of the seat tube;

wherein said connection rod is engaged with the seat tube such that said connection rod is received in the connection sleeve of the seat tube, and that said rear threaded segment of said connection rod is engaged with a fastening nut and an adjusting nut, and that said circular groove of said connection rod is engaged with a C-shaped retaining ring; and wherein the top tube of the bicycle is fastened with one end of a first support rod which is fastened at another end thereof with a juncture of the seat tube and the down tube of the bicycle, said first support rod further fastened pivotally with a second support rod by a pivot.

2. The bicycle shock-absorbing assembly as defined in claim 1, wherein said rear reinforcing member and said fastening nut are provided therebetween with an elastic ring.

3. The bicycle shock-absorbing assembly as defined in claim 1, wherein said second support rod has two through holes for receiving said pivot; and wherein said pivot has a threaded end which is engaged with a locating nut.

4. The bicycle shock-absorbing assembly as defined in claim 1, wherein said front reinforcing member and said rear reinforcing member are replaced by an engagement member of a tubular construction and having an engaging end, a retaining end, and a flange located between said engaging end and said retaining end; and wherein said connection rod is engaged with the seat tube of the bicycle such that said engaging end of said engagement member is fitted securely into one end of an axial hole of the connection sleeve of the seat tube, and that said retaining end of said engagement member is secured to one end of said coil spring, and further that said flange of said engagement member is stopped by an end edge of the axial hole of the connection sleeve of the seat tube of the bicycle.

* * * * *